(12) United States Patent
Huck et al.

(10) Patent No.: US 7,315,671 B2
(45) Date of Patent: Jan. 1, 2008

(54) DISPLAY ILLUMINATION SYSTEM AND MANUFACTURING METHOD THEREOF

(75) Inventors: Hubertina Petronella Maria Huck, Eindhoven (NL); Rifat Ata Mustafa Hikmet, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 156 days.

(21) Appl. No.: 10/545,128

(22) PCT Filed: Jan. 20, 2004

(86) PCT No.: PCT/IB2004/050038

§ 371 (c)(1),
(2), (4) Date: Aug. 9, 2005

(87) PCT Pub. No.: WO2004/070464

PCT Pub. Date: Aug. 19, 2004

(65) Prior Publication Data

US 2006/0139948 A1    Jun. 29, 2006

(30) Foreign Application Priority Data

Feb. 10, 2003 (NL) .................................... 1022638

(51) Int. Cl.
G02B 6/02 (2006.01)
G02B 6/10 (2006.01)

(52) U.S. Cl. .................... 385/18; 385/15; 385/129

(58) Field of Classification Search .............. 385/18, 385/15, 129
See application file for complete search history.

(56) References Cited

U.S. PATENT DOCUMENTS

| | | | | | |
|---|---|---|---|---|---|
| 4,711,525 | A | * | 12/1987 | Feth | 385/11 |
| 4,735,506 | A | * | 4/1988 | Pavlath | 356/464 |
| 5,037,205 | A | * | 8/1991 | Pavlath | 356/464 |
| 5,361,320 | A | * | 11/1994 | Liu et al. | 385/143 |
| 5,479,542 | A | * | 12/1995 | Krivoshlykov | 385/30 |
| 6,282,341 | B1 | * | 8/2001 | Digonnet et al. | 385/37 |
| 6,845,190 | B1 | * | 1/2005 | Smithwick et al. | 385/25 |
| 6,876,806 | B2 | * | 4/2005 | Lazarev et al. | 385/128 |
| 2002/0090188 | A1 | * | 7/2002 | Lazarev et al. | 385/128 |
| 2003/0034431 | A1 | * | 2/2003 | Mandella et al. | 250/201.3 |
| 2003/0058383 | A1 | * | 3/2003 | Jagt et al. | 349/65 |
| 2006/0103850 | A1 | * | 5/2006 | Alphonse et al. | 356/479 |
| 2006/0291789 | A1 | * | 12/2006 | Folkenberg et al. | 385/123 |

FOREIGN PATENT DOCUMENTS

| | | |
|---|---|---|
| EP | 1 258 746 | 11/2002 |
| WO | WO 97/08582 | 3/1997 |
| WO | WO 98/12593 | 3/1998 |

* cited by examiner

*Primary Examiner*—K. Cyrus Kianni

(57) ABSTRACT

An illumination system (8) comprises an optical waveguide (18) which is made from optically transparent components and has four end faces (10, 10'). A light source (12) whose light is coupled into the optical waveguide (18) via one of the end faces (10), is situated opposite this end face (10). The optical waveguide (18) has a light guide (30). A number of fibers (34) are attached to a surface (32) of the light guide (30). The fibers (34) have birefringent properties. A preferred method of providing the birefringent properties is to stretch fibers (34) of a suitable polymer plastic material in their longitudinal direction. The light from the light source (12) will be polarized by the fibers (34) and polarized light will be outcoupled from the optical waveguide (18) via an exit surface (16). The illumination system (8) may be used for front or back lightning of LCD panels for e.g. mobile phones, PDA's, etc.

16 Claims, 3 Drawing Sheets

DISPLAY ILLUMINATION SYSTEM AND MANUFACTURING METHOD THEREOF

FIELD OF THE INVENTION

The present invention relates to an illumination system comprising an optical waveguide being optically transparent and having an exit surface and a plurality of end faces, opposite to at least one of which a light source is situated, whose light is to be coupled in to the optical waveguide at said at least one end face, the optical waveguide having polarizing means integrated therein for polarizing the light emitted by the light source.

The invention further relates to a method of manufacturing polarizing means in an optical waveguide being optically transparent and having an exit surface and a plurality of end faces, opposite to at least one of which a light source is adapted to be situated, whose light is to be coupled in to the optical waveguide at said at least one end face, the polarizing means being adapted to polarize the light emitted by the light source.

BACKGROUND OF THE INVENTION

LCD displays are frequently used for displaying information to a user, below called the viewer, of a mobile phone, a PDA or other electronic device. An LCD display is preferably illuminated with polarized light. The illumination could be made either as a back light illumination where the light is emitted towards the viewer via the display panel or as a front light illumination where the light is emitted towards the display panel and is then reflected back towards the viewer. The international application 97/08582 describes a display device including an optical waveguide for providing illumination of a display panel. The optical waveguide is provided with grooves that are filled with a birefringent material. The birefringent material in the grooves splits light incoming from the side into two light beams having mutually opposite polarization. The grooves of the optical waveguide are thus filled with an anisotropic uniaxial material, for example nematic liquid crystalline material, to achieve the outcoupling of polarized light of a desired polarization towards the display panel that is to be illuminated. The optical wave guide is however sensitive to the manufacturing steps and may, if the grooves do not obtain a high quality with respect to surface properties and filling, result in the outcoupling of a substantial amount of light of the not wanted polarization.

SUMMARY OF THE INVENTION

An object of the present invention is to provide an illumination system which decreases or eliminates the drawbacks of the prior art and thus provides an illumination system which is easy to manufacture and provides an outcoupling of substantially only light of the desired polarization.

This object is achieved with an illumination system according to the preamble and characterized in that the polarizing means comprises a light guide, which is made of an optically transparent material and is adapted to receive said light coupled in to the optical waveguide at said at least one end face, and a plurality of fibers that are made of an optically transparent material and have birefringent properties, the fibers forming a layer on the light guide at the exit surface, the fibers being adapted to polarize the light received by the light guide for outcoupling polarized light via the exit surface.

An advantage of the invention is that fibers with a very smooth surface are often easily available. The smooth surface of the fibers decreases the formation of stray light and increases the amount of polarized light that is deflected in the desired direction. The fibers are preferably such fibers that are available as staple commodities in e.g. the optical communications area or the fabric manufacturing area.

An other advantage of the invention is that the fibers make it easier to control the degree of birefringence by proper choice of type, material, shape and diameter of the fibers and to make those properties be the same for all individual fibers attached on the light guide. Thus it becomes much easier to provide an optical waveguide that provides the desired direction for the outcoupled polarized light.

In prior art optical waveguides the so called director function, i.e. the direction of orientation of the optical axis, of the birefringent material, i.e. the function that makes light of one polarization and incident from a certain direction see only one refractive index, either the ordinary or the extraordinary refractive index depending on the polarization, is not always well controlled. In prior art light of one polarization, e.g. s-light, may thus see both the ordinary and the extraordinary refractive index thus "wasting" some light that is thereby not outcoupled as desired. Further, still in the prior art, some light of the other polarization, e.g. p-light, also sees both the ordinary and the extraordinary refractive index and unintentionally becomes outcoupled to some degree. The invention provides an improved director function and outcouples all of, and almost only, the light of the desired polarization.

The measure according to claim 2 has the advantage of providing a still better control of the direction of the outcoupled polarized light.

The measure according to claim 3 has the advantage of providing an efficient way of providing fibers with birefringent properties. Fibers made of plastic polymer materials are easily available. By adjusting the degree of stretching the birefringent properties can be controlled with a high accuracy. By stretching the fibers it is ensured that the birefringent properties of the fibers are dependent on the direction of incident light. Light incident in a direction perpendicular to the stretched fibers, which have been longitudinally stretched, will see the two different refractive indexes, while light incident in the fibre direction will only see one refractive index, being the ordinary refractive index. The stretching of the fibers provides for an optimum director function in that light of a certain polarization, s-light or p-light, incident perpendicular to the stretched fibers will see only one refractive index. Thus the light of the desired polarization will become outcoupled to a very high degree while light of the unwanted polarization will hardly be outcoupled at all.

The measure according to claim 4 has the advantage of protecting the fibers from scratches and dirt that might deflect the polarized light in an unwanted direction. Further the resin layer assists in keeping the fibers in place on the light guide. Since the resin layer is isotropic it will not itself contribute to the polarization. This makes the polarization behaviour of the optical light guide easier to control.

The measure according to claim 5 has the advantage that the light of the polarization which is not deflected by the birefringent fibers will also not be deflected or reflected when passing from the resin layer into the fibers and then from the fibers and back into the resin layer. This decreases the amount of light of the unwanted polarization that is outcoupled from the optical wave guide. Further the control of the direction of the light of the desired polarization is improved as unwanted deflection and reflection of that light is also avoided.

The measure according to claim 6 has the advantage of further improving the control of the direction of the light of the unwanted polarization such that it is not outcoupled in the same direction as the light of the desired polarization.

The measure according to claim 7 has the advantage of providing an efficient outcoupling of light of the desired polarization and in well defined directions. Thus very little of the light of the desired polarization is wasted. Further the close packing of the fibers provide a very even light distribution over the surface of the object, such as a display panel, which the illumination system is intended to illuminate.

The measure according to claim 8 has the advantage that woven and non woven structures are often easily available and provide a very close packed fibre structure. Thus an even illumination of e.g. a display panel are obtained. The woven and non woven structures are also particularly easy to work with in applications were a stretching of the fibers is employed for providing birefringent properties.

A further object of the invention is to provide a method of manufacturing polarizing means in an optical waveguide which method is more efficient than the methods of prior art and provides a polarizing means with a higher quality. This object is achieved with a method according to the preamble and characterized by the steps of forming a light guide of an optically transparent material for receiving said light coupled in to the optical waveguide at said at least one end face, stretching fibers that are made of an optically transparent material to provide the fibers with birefringent properties, and attaching the fibers to the light guide at a surface thereof being adjacent to the exit surface so as to polarize the light received by the light guide and to outcouple polarized light via the exit surface.

An advantage of this method is that the birefringent properties of the fibers can be controlled with a high accuracy by adjusting the degree of stretching. The stretching of the fibers may be uniaxial (longitudinal) or biaxial. The uniaxial stretching provides birefringent properties to the fibers and is preferred. The biaxial stretching of fibers provides them with birefringent properties. Birefringent fibers outcouple also light of the undesired polarization and is therefore less preferred. The fibers themselves are easily available as staple commodities with smooth surfaces, which decreases the amount of stray light.

These and other aspects of the invention will be apparent from and elucidated with reference to the embodiments described hereinafter.

BRIEF DESCRIPTION OF THE DRAWINGS

The invention will now be described in more detail and with reference to the appended drawings in which.

The Figures are diagrammatic and not to scale. Corresponding components generally have the same reference numerals.

DESCRIPTION OF PREFERRED EMBODIMENTS

In the description below "birefringent" means that a transparent object has one refractive index, the ordinary refractive index, towards light of a first polarization and another refractive index, the extraordinary refractive index, towards light of a second polarization being opposite to said first polarization. Materials that show birefringence can be called "anisotropic". A material that has the same refractive index regardless of the polarization of the light is called "isotropic".

Figure 1:
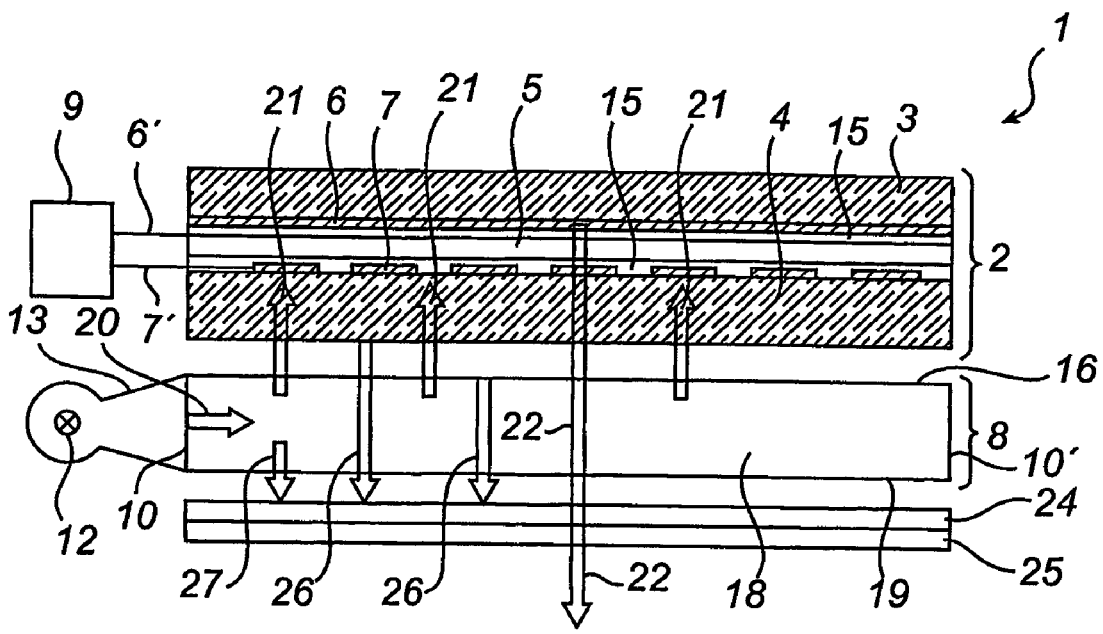
FIG. 1 is a cross-section of an embodiment of a reflective display device equipped with an illumination system according to the invention.

A display device 1 shown diagrammatically in FIG. 1 comprises an image display panel 2 and an illumination system 8 located between a not shown viewer and the display panel 2 and thus providing a front light illumination of the display panel 2.

The image display panel 2 comprises a liquid crystalline material 5 between two substrates 3, 4, based on the twisted nematic (TN), the supertwisted nematic (STN) or the ferroelectric effect so as to modulate the direction of polarization of incident light. The image display panel 2 comprises, for example, a matrix of pixels for which light-reflecting picture electrodes 6 are provided on the substrate 3. The substrate 4 is light-transmissive and has one or more light-transmissive electrodes 7 of, for example, ITO (indium tin oxide). The picture electrodes are provided with electric voltages via connection wires 6', 7' which are provided with drive voltages by means of a drive unit 9. The substrates and electrodes are coated with orientation layers 15 in known manner.

The illumination system 8 comprises an optical waveguide 18 which is made from optically transparent components and has four end faces 10, 10'. A light source 12 whose light is coupled into the optical waveguide 18 via one of the end faces, for example 10, is situated opposite this end face. The light source 12 may be, for example, a rod-shaped fluorescence lamp. The light source may alternatively be constituted by one or more light-emitting diodes (LED), notably in flat panel display devices having small image display panels such as, for example, portable telephones. Moreover, the light source 12 may be detachable.

The exit face 16 of the optical waveguide 18 faces the image display panel 2. Each end face 10' of the transparent plate in which light is not coupled in may be provided with a reflector. In this way, light which is not coupled out on the exit face 16 and consequently propagates through the optical waveguide 18 and arrives at an end face 10' is thus prevented from leaving the optical waveguide 18 via this end face 10'.

To prevent light from leaving the optical waveguide 18 without contributing to the light output of the illumination system 8, light of the lamp 12 is preferably coupled into the optical waveguide 18 via coupling means 13.

A light beam 20 from the lamp 12 is converted in a manner to be described below into polarized light so that mainly light of one polarization is deflected towards the reflective image display panel 2 (beams 21) and, dependent on the state of a pixel, reflected (beam 22) with the same or the opposite polarity.

After reflection on the pixel, the light of the opposite polarisation is converted in a phase plate or retarder 24 into linearly polarized light and reaches a polarizer 25 with such a direction of the transmission axis in this embodiment that the reflected light is absorbed. Similarly, polarized light of the same polarisation is passed by the polarizer 25.

Stray light, which is reflected on internal surfaces (for example, the surface 16), has a polarisation which is opposed to that of the beam 22 and is also converted by the retarder 24 into linearly polarized light which is absorbed by the polarizer 25 (beams 26). Also parasitic light generated in the optical waveguide 18 due to internal reflection is absorbed by the polarizer 25 (beam 27).

Figure 2:
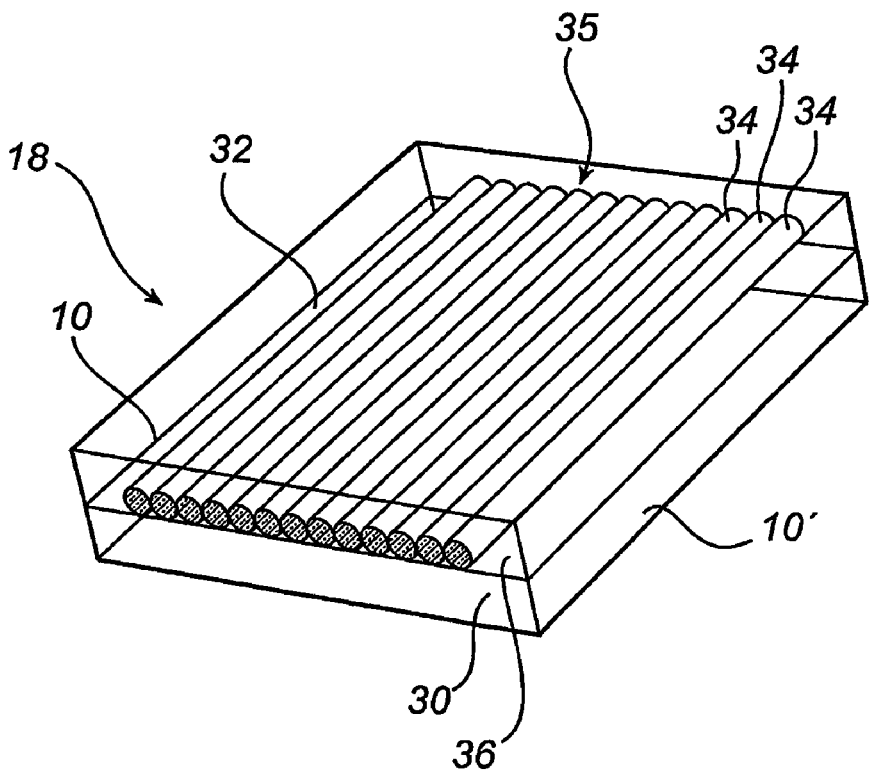
FIG. 2 is a three dimensional view of an optical waveguide shown in FIG. 1.

FIG. 2 is a three dimensional view of the optical wave guide 18. The optical waveguide 18 comprises a flat light guide 30 being a rectangular parallelepiped made from a material, such as PMMA (polymethyl methacrylate), having good optical properties. The dimensions of the light guide 30 are adapted to fit the actual application but could, as a typical example, for a PDA (Personal Digital Assistant) display be 60 mm by 60 mm with a thickness of 2 mm. The light guide 30 has a flat surface 32 which faces the display panel 2. On top of the surface 32 a number of parallel fibers 34 have been attached adjacent to each other to form a layer 35 of parallel fibers 34. The fibers 34 are parallel to that end face 10 which receives the light from the lamp 12. The diameter of the fibers 34 are adjusted to fit the actual application but could, as an example, be 25 micrometers.

The fibers 34 are made from a material, such as PET (polyethylene terephthalate) or PEN (polyethylene naphthalate), that on stretching obtains birefringent properties, i.e. the fibers 34 are anisotropic with respect to incident light. On uniaxial stretching such fibers obtain an ordinary refractive index, also called the normal refractive index, and an extraordinary refractive index, which, in the case of PET or PEN fibers, is higher than the ordinary refractive index. The degree of stretching and the material determine how much the extraordinary refractive index will differ from the ordinary refractive index. Prior to attaching them to the surface 32 the fibers 34 have thus been stretched to such a degree that an extraordinary refractive index is obtained, i.e. that the fibers 34 become birefringent. The attachment of the fibers 34 to the light guide 30 has been made with the aid of a resin layer 36. A resin in a liquid state has been laminated on the light guide 30 together with the fibers 34 and subsequently cured with the help of e.g. UV-light to form the resin layer 36 with the fibers 34 embedded therein. The resin is chosen to be isotropic and to have, in the cured state, a refractive index which is substantially the same as the ordinary refractive index of the fibers 34 in order to outcouple s-polarized light. If, in an alternative embodiment, it is instead desired to outcouple the p-polarized light the refractive index of the cured resin should be substantially the same as the extraordinary refractive index of the fibers.

Figure 3:
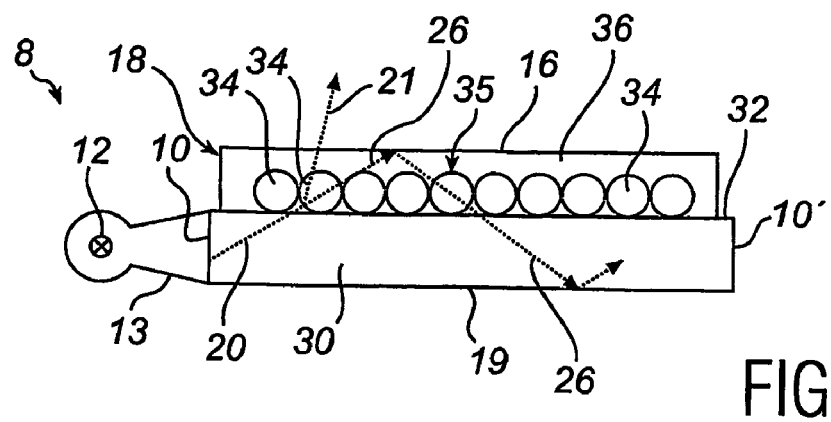
FIG. 3 is a cross section of the optical waveguide of FIG. 2.

As an example FIG. 3 shows the behaviour of a beam 20 of unpolarized light emitted from the light source 12. When the beam 20 enters the fibre 34 being birefringent and having an extraordinary refractive index, which is higher than that of the resin layer 36 in which it is embedded, the beam 20 is split up in the beam 21 being s-polarized light (i.e. the plane of the light wave is coincident with the plane of the paper) and the beam 26 being p-polarized light (i.e. the plane of the light wave is perpendicular to the plane of the paper). As is clear from FIG. 3 the beam 26 being a p-polarized light is not deflected at all since it is subject to the ordinary refractive index of the fibre 34, the ordinary refractive index of the fibre 34 being substantially the same as the refractive index of the resin layer 36. The beam 21 being s-polarized light is however deflected since it is subject to the extraordinary refractive index, which is higher than the refractive index of the resin layer 36, of the fibre 34. As is shown in FIG. 3 the beam 21 (s-polarized light) is outcoupled from the optical waveguide 18 in a substantially right angle to the exit surface 16. The beam 21 then enters the display panel 2 as described above. The beam 26 is totally internally reflected inside the optical waveguide 18 and may finally be outcoupled from the optical waveguide 18 at a low angle, such that it does not reach the display panel 2, or leave the optical waveguide 18 via one of the end faces 10, 10'.

As shown in FIG. 3 the light from the light source 12 is coupled in to the light guide 30 at a rather low angle from the plane of the light guide 30 while the s-polarized light outcoupled is outcoupled perpendicular to the plane of the light guide 30. The low angle of the light beam 20 from the light source 12 prevents light of the unwanted polarity, i.e. the p-polarized light, from being outcoupled via the exit surface 16 and instead reflects it from that surface 16.

Figure 4:
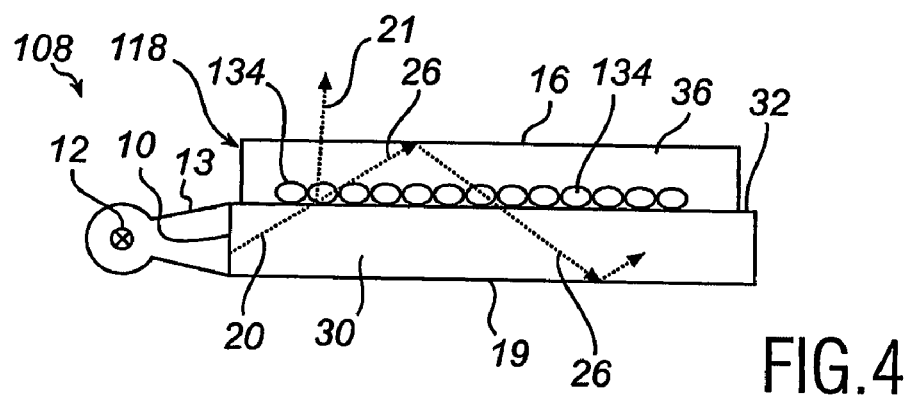
FIG. 4 is a cross section of an optical waveguide according to a second embodiment.

FIG. 4 shows an alternative embodiment of the invention. The main difference compared to the embodiment of FIG. 3 is that the illumination system 108 comprises an optical waveguide 118 including oval fibers 134 embedded in the resin layer 36. The oval fibers 134 may, as indicated in FIG. 4, result in a larger deflection of the s-polarized light forming the beam 21.

Figure 5:
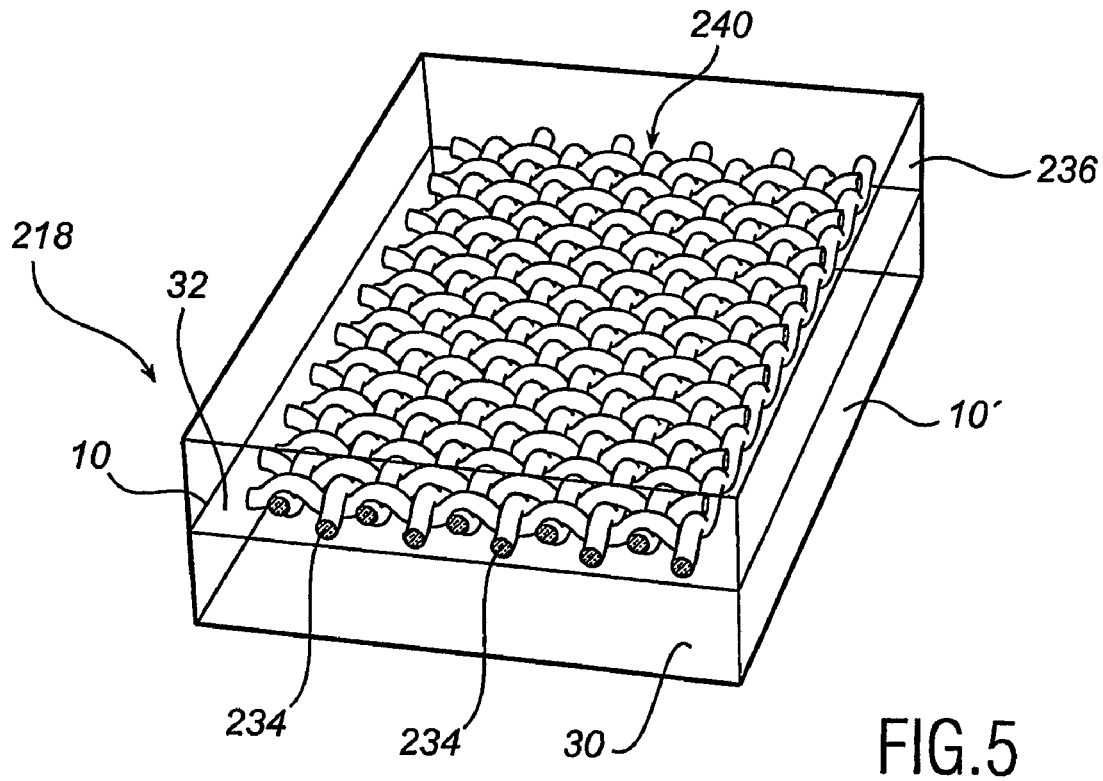
FIG. 5 is a three dimensional view of an optical waveguide according to a third embodiment.

FIG. 5 shows yet another embodiment of the invention. The main difference compared to the embodiment of FIG. 2 is that an optical wave guide 218 has fibers 234 which form part of a woven structure 240 that has been attached to the light guide 30 by being embedded in a resin layer 236. Prior to embedding the woven structure 240 it has been stretched in a direction being parallel to that end face 10 being opposite to the light source 12. By stretching the woven structure 240 those fibers 234 being parallel to the end face 10 have been provided with birefringent properties and will polarize light from the light source 12 according to the same principles as described in FIG. 3

Figure 6:
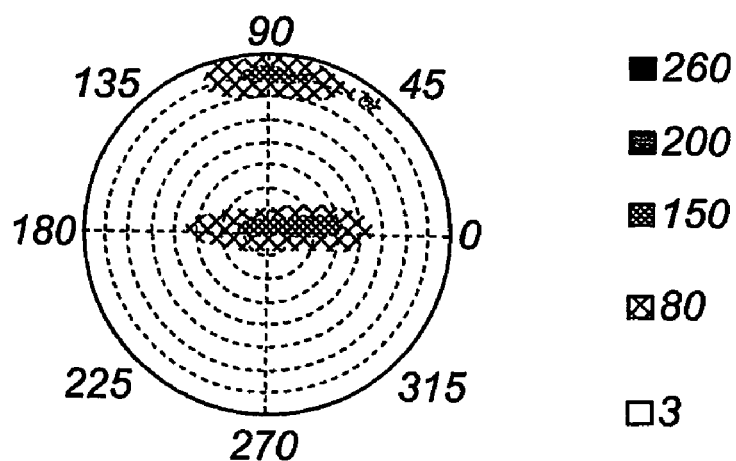
FIG. 6 is a diagram showing outcoupling of polarized light of the desired polarization using an optical waveguide according to prior art.
Figure 7:
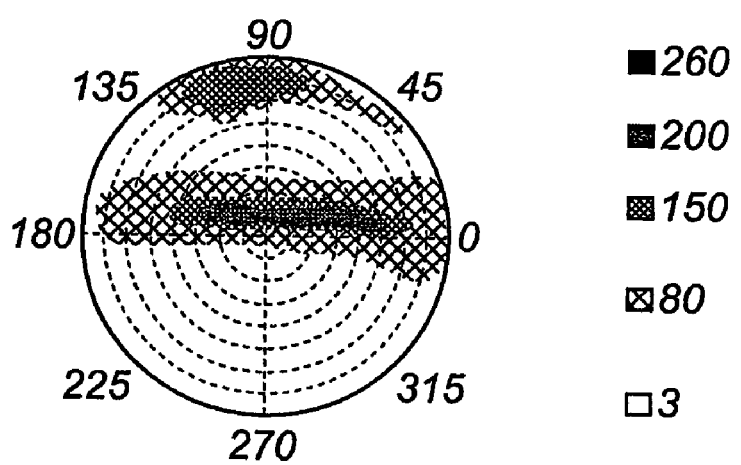
FIG. 7 is a diagram showing outcoupling of polarized light of the desired polarization using an optical waveguide according to the invention.
Figure 8:
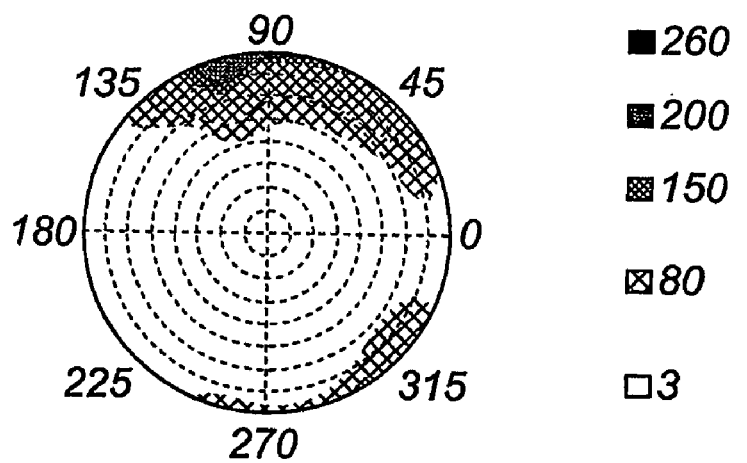
FIG. 8 is a diagram showing outcoupling of polarized light of the unwanted polarization using an optical waveguide according to the invention.

FIGS. 6-8 describe the results of experiments that were made to verify the efficiency of the invention. In the experiments the polarized angular luminance distribution was measured using an Ezcontrast 160 measuring system from Eldim S. A. The scale in FIGS. 6-8 represents from 3 to 260 lm/cd$^2$. FIG. 6 shows the outcoupling of s-polarized light (s-light) of a prior art optical waveguide which was similar in design to that described in the above mentioned international application WO 97/08582. The desired direction of outcoupling of polarized light, in this case the s-light, is, as mentioned above, perpendicular to the exit surface 16 of the optical wave guide. In FIG. 6 the luminance in this desired direction is represented along an axis passing through the 0 and 180 labels. It is however clear from FIG. 6 that the prior art optical waveguide also presents a high luminance near the 90 label. This luminance along the 90 label represent s-light that has become outcoupled at a small angle, i.e. almost along the exit surface instead of perpendicular to it. Such low angle s-light will not reach the display panel and is thus wasted. The comparably large outcoupling of s-light at a low angle is due to scattering of the light, probably at irregularities in the grooves and in the anisotropic uniaxial nematic liquid crystalline material filling the grooves.

In order to test the invention an optical waveguide according the invention was manufactured. A flat PMMA light guide was formed. A PET film was stretched to 4,2 times its original length to obtain birefringent properties and was subsequently cut into fibers. The fibers were then laminated onto the light guide with the help of an acrylic resin having, after being cured with UV-light, substantially the same refractive index as the light guide and as the ordinary refractive index of the fibers.

FIG. 7 shows the luminance of s-light of the optical wave guide according to the invention. It is clear from FIG. 7 that most of the s-light is outcoupled in a direction being perpendicular to the exit surface (i.e. the s-light luminance has a strong maximum along the 0-180 axis).

FIG. 8 shows the luminance of the p-polarized light (p-light) of the optical wave guide according to the invention. It is clear from FIG. 8 that almost no p-light is outcoupled perpendicular to the exit surface (i.e. the p-light luminance along the 0-180 axis is very low). The factor, also called the contrast, of s-light versus p-light luminance in the direction perpendicular to the exit surface is about 15.It is thus obvious that an optical waveguide according the invention is very efficient in providing a polarized light for illuminating a display panel. With fibers, such as optical fibers, with more well defined and smooth surface properties than those obtained by cutting a stretched PET-film, it is to be expected that a very high contrast could be result with the help of the invention and that the amount of s-light outcoupled at a too low angle would decrease further.

It will be appreciated that numerous modifications of the embodiments described above are possible within the scope of the appended claims.

Thus, for example, the fibers could form part of a woven structure, as described in FIG. 5, be parallel fibers, as described in FIG. 3 or form part of a nonwoven structure.

The stretching should be made in the longitudinal direction of the fibers. With woven and non-woven structures the stretching is preferably made in that direction being parallel to that end face opposite to which the light source is located. The degree of stretching could be chosen so as to obtain the desired birefringent properties of the fibre used.

As alternative to using one light source it is also possible to use two light sources located at opposite end faces.

With fibers included in a woven or non woven structure stretching could be performed in two perpendicular directions. Thus the fibers located in a first direction could be stretched uniaxially in a first step and then the fibers located in a second, perpendicular, direction could be stretched uniaxially in a second step. Two light sources may then be located at two perpendicular end faces of the waveguide in which the woven or non woven structure has been integrated. In such a case light incident from both directions may be polarized by the birefringent fibers of the woven or non woven structure.

It is also possible to mix different fibers to obtain a layer of fibers where some of the fibers are birefringent and other fibers are isotropic or only slightly birefringent.

Individual fibers may extend along the entire width or length of the light guide or short lengths of fibers may be used which are ordered to extend along the entire length of the waveguide.

The display device 1 shown in FIG. 1 comprises a so called front lighting illumination system 8, i.e. the illumination system 8 is located between the display panel 2 and the viewer who observes the light emitted via the polarizer 25. It is obvious that the illumination system according to the invention may be used also as a back lighting system, i.e. the display panel is located between the illumination system and the viewer. In a back lighting illumination system the polarized light from the optical waveguide is directed towards the display panel which will, depending on the status of the pixels, allow some of the polarized light to pass through and reach the viewer. Thus the invention is applicable for different types of liquid crystal displays (e.g. transflective, reflective, or transmissive) and different types of liquid crystal effects and is not limited to the example given above.

As alternative to fibers 34 it is also possible to use strips and similar objects. The shape of the fibers, circular, oval, square or triangular, determines, together with the relation between the ordinary and the extraordinary refractive indexes, the direction of the outcoupled light.

To summarize an illumination system 8 comprises an optical waveguide 18 which is made from optically transparent components and has four end faces 10, 10'. A light source 12 whose light is coupled into the optical waveguide 18 via one of the end faces 10, is situated opposite this end face 10. The optical waveguide 18 has a light guide 30. A number of fibers 34 are attached to a surface 32 of the light guide. The fibers 34 have birefringent properties. A preferred method of providing the birefringent properties is to stretch fibers 34 of a suitable polymer plastic material in their longitudinal direction. The light from the light source 12 will be polarized by the fibers 34 and polarized light will be outcoupled from the optical waveguide via an exit surface 16. The illumination system may be used for front or back lightning of LCD panels for e.g. mobile phones, PDA's, etc.

The invention claimed is:

1. An illumination system comprising an optical waveguide being optically transparent and having an exit surface and a plurality of end faces, opposite to at least one of the plurality of end faces, a light source is situated, whose light is to be coupled in to the optical waveguide at said at least one end face, the optical waveguide having polarizing means integrated therein for polarizing the light emitted by the light source, wherein the polarizing means comprises a light guide, which is made of an optically transparent material and is adapted to receive said light coupled in to the optical waveguide at said at least one end face, and a plurality of optical fibers that are made of an optically transparent material and have birefringent properties, the fibers forming a layer on the light guide at the exit surface, the fibers being adapted to polarize the light received by the light guide for outcoupling polarized light via the exit surface.

2. The illumination system according to claim 1, wherein at least some of the fibers are parallel to said at least one end face at which the light from the light source is coupled in.

3. The illumination system according to claim 1, wherein the fibers are made of a birefringent stretched polymer material.

4. The illumination system according to claim 1, wherein the polarization means further comprises an isotropic resin layer covering the fibers.

5. The illumination system according to claim 4, wherein the fibers have an ordinary refractive index and an extraordinary refractive index, the ordinary refractive index of the fibers being substantially the same as the refractive index of the resin layer.

6. The illumination system according to claim 1, wherein the light guide is made of an isotropic material having a refractive index being substantially the same as the ordinary refractive index of the fibers.

7. The illumination system according to claim 1, wherein the fibers are close-packed and parallel to each other.

8. The illumination system according to claim 1, wherein the fibers are comprised in a woven or non woven structure applied on the light guide.

9. An illumination system comprising:
an optically transparent waveguide,
a light source arranged to couple light in to at least one of a plurality of end faces of the optically transparent waveguide, the optically transparent waveguide comprising an integrated polarizer arranged to polarize light coupled from the light source, the polarizer comprising:
an optically transparent light guide adapted to receive said light coupled in to the optical waveguide; and
a plurality of optically transparent birefringent optical fibers, wherein the fibers are arranged to form a layer on the light guide at an exit surface of the optically transparent waveguide, and are arranged to polarize the light received by the light guide for outcoupling polarized light via the exit surface.

10. The illumination system according to claim 9, wherein at least some of the fibers extend parallel to said at least one end face.

11. The illumination system according to claim 9, wherein the fibers are made of a stretched birefringent polymer.

12. The illumination system according to claim 9, wherein the polarizer comprises an isotropic resin layer covering the fibers.

13. The illumination system according to claim 12, wherein the fibers have an ordinary refractive index and an extraordinary refractive index, the ordinary refractive index of the fibers being substantially the same as the refractive index of the resin layer.

14. The illumination system according to claim 9, wherein the light guide is made of an isotropic material having a refractive index being substantially the same as the ordinary refractive index of the fibers.

15. The illumination system according to claim 9, wherein the fibers are close-packed and extend parallel to each other.

16. The illumination system according to claim 9, wherein the fibers are comprised in a woven or non woven structure applied on the light guide.

* * * * *